Sept. 1, 1925.

L. C. THOMSEN

MILK VALVE

Filed Oct. 30, 1923

1,552,094

Inventor
Lars C. Thomsen

Patented Sept. 1, 1925.

1,552,094

UNITED STATES PATENT OFFICE.

LARS C. THOMSEN, OF KENOSHA, WISCONSIN, ASSIGNOR TO TRI-CLOVER MACHINE COMPANY, OF KENOSHA, WISCONSIN.

MILK VALVE.

Application filed October 30, 1923. Serial No. 671,798.

*To all whom it may concern:*

Be it known that I, LARS C. THOMSEN, a citizen of the United States, and resident of Kenosha, in the county of Kenosha and State of Wisconsin, have invented certain new and useful Improvements in Milk Valves; and I do hereby declare that the following is a full, clear, and exact description thereof.

This invention relates to milk valves.

Objects of this invention are to provide a milk valve which is highly sanitary, which may be easily taken apart so that every portion is readily accessible for cleaning, which consists of a small number of readily assembled parts, which is so constructed that the exact tension of the valve stem may be secured and retained, and which avoids the use of an unsanitary stuffing box, while at the same time securing a tight joint between the valve stem and the valve body.

An embodiment of the invention is shown in the accompanying drawings, in which.

Figure 1:
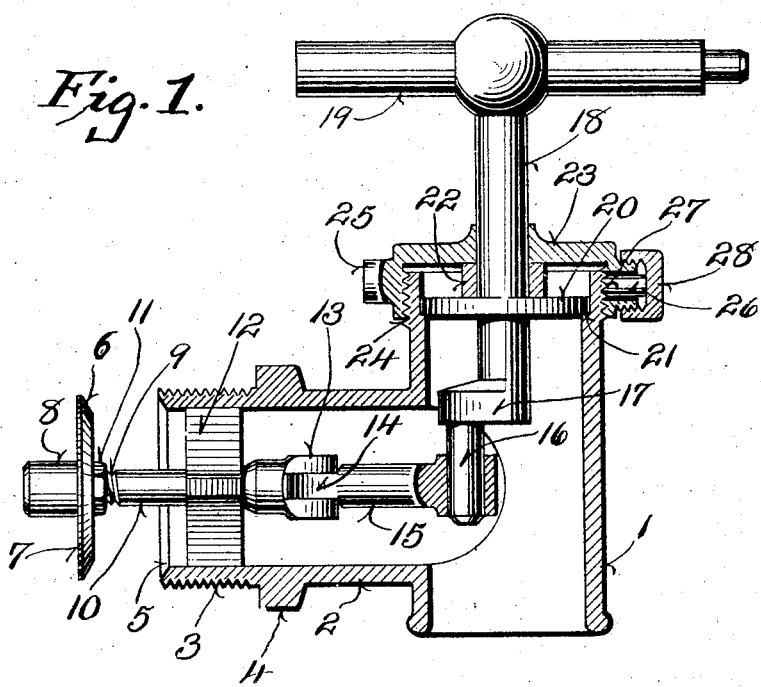
Figure 1 is a vertical sectional view through the valve.
Figure 2:
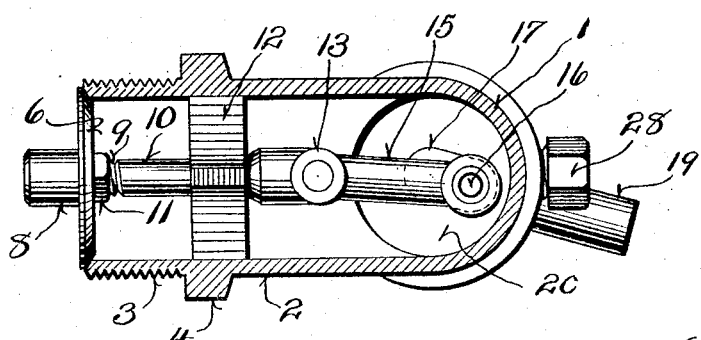
Figure 2 is a horizontal sectional view.

The valve consists of a main body which comprises a vertical cylindrical portion 1 and a horizontal portion 2 provided with a threaded portion 3 and with hexagonal or other flat faces 4. This body portion is adapted to be screwed into place in the side wall of a milk vat, for instance, and to occupy the position shown in Figure 1.

The outer end of the member 3 is provided with a beveled valve seat 5 which accurately conforms to the beveled surface 6 of the disc-like valve 7. This valve, it will be noted, is provided with a hub 8 which is internally threaded and screwed upon the threaded portion 9 of the oscillating rod 10, a lock nut 11 securely retaining the valve in its adjusted position. A guide in the form of a plurality of wide radial arms 12 integrally formed with the rod 10 is provided, and the wide outer faces of such arms are arranged in loose sliding relation with the interior of the tubular portion 2 of the body of the valve.

This valve rod is provided with a pair of spaced lugs 13 which receive between them the lug 14 of a pitman 15. The forward end of this pitman fits a downwardly extending pin 16 of the crank arm 17, such crank arm being preferably formed integrally with the valve stem 18. Any convenient means may be provided for manipulating the valve stem, for instance, the transverse handle 19.

In milk valves it is highly desirable that all unsanitary conditions be avoided and therefore the usual unsanitary packing is omitted from this valve. In place of the packing a disc 20 is rigidly carried by the stem 18 of the valve and seats upon the shoulder 21 formed in the body portion. A spacing collar or washer 22 is provided upon the valve stem immediately above the disc 20 and contacts with the lower surface of the cap 23 of the valve, such cap being screwed upon the threaded portion 24 of the body and provided with wrench receiving lugs 25. It is to be noted that the disk 20 is of a diameter several times that of the valve stem and that the disk has its peripheral edges held in contact with the shoulder 21 and thus effectively guides and holds the valve stem against lateral rocking motion. This wide spacing of the disk has been found to aid materially in the proper positioning of the valve stem even when it is acted upon by stresses impressed upon the crank pin, such stresses tending to rock the valve stem laterally. The exact tension desired for the valve rod may be secured by screwing the top down to the desired extent, thus causing a bind between the top washer or spacer 22, the disc 20, and the shoulders 21. This desired tension is maintained by means of a plunger 26 which slidably fits within an aperture in the top 23 and is provided with a serrated face 27 which accurately fits the threads 24 of the body portion. The outer end of this plunger 26 is engaged and forced inwardly by means of a small cap 28 which is threaded upon a projection extending outwardly from the valve cap 23. This last described construction therefore functions in the manner of a lock to retain the valve cap in the exact adjusted position desired.

When it is desired to clean the valve, it is merely necessary to loosen the cap 28 and to unscrew the main cap 23. Thereafter the valve stem and associated parts may be lifted directly upwardly from the body portion. The valve 6 and its associated parts may then be drawn to the left in Figure 1 and readily removed and cleaned. It is to be noted that the lugs 13 and 14 hold the pitman 15 in the desired horizontal position and thus avoid the necessity of any securing means between the pin 16 and the pitman.

It will thus be seen that a milk valve has been provided which may be readily kept in a sanitary condition, which may be readily assembled, in which the desired tension may be maintained, and in which unsanitary packing is avoided.

Although the invention has been described in considerable detail, it is to be understood that it may be variously embodied and is therefore to be limited only as claimed.

I claim:—

A milk valve comprising a body portion having a vertically extending cylindrical part and a horizontal cylindrical part in communication with each other, said horizontal part having an externally located valve seat formed thereon, said vertical portion being threaded, a cap screwed downwardly upon the upper end of said vertical portion, a valve stem extending through said cap and terminating in a crank arm, a valve rod guided within said horizontal part, a valve carried by the outer end of said rod, a pitman supported by said valve rod and connecting said valve rod and crank, a disc carried by said valve stem, a shouldered portion formed in said vertical cylindrical portion and fitting said disc, a spacer located between said cap and disc and adapted to force said disc downwardly against said shouldered portion when said cap is screwed into place, a plunger extending radially through said cap, said plunger having serrations fitting the threads of said vertical portion, said cap having an externally threaded apertured boss receiving said plunger, and an auxiliary cap screwed upon said threaded boss and forcing said plunger inwardly into contact with the vertical portion to lock the first mentioned cap in position.

In testimony that I claim the foregoing I have hereunto set my hand at Kenosha, in the county of Kenosha and State of Wisconsin.

LARS C. THOMSEN.